(12) United States Patent
Townsend et al.

(10) Patent No.: US 12,027,890 B2
(45) Date of Patent: Jul. 2, 2024

(54) MODULATING SUPPLY VOLTAGE GENERATED BY VOLTAGE REGULATOR FOR TRANSMISSION OF DATA AND POWER

(71) Applicant: QUALCOMM Incorporated, San Diego, CA (US)

(72) Inventors: Brendan David Townsend, Cambridge (GB); Adam Robert Piekarski, Cambridge (GB); Joseph Heleine, Cambridge (GB)

(73) Assignee: QUALCOMM INCORPORATED, San Diego, CA (US)

( * ) Notice: Subject to any disclaimer, the term of this patent is extended or adjusted under 35 U.S.C. 154(b) by 283 days.

(21) Appl. No.: 17/211,125

(22) Filed: Mar. 24, 2021

(65) Prior Publication Data

US 2021/0313810 A1   Oct. 7, 2021

Related U.S. Application Data

(60) Provisional application No. 63/004,339, filed on Apr. 2, 2020.

(51) Int. Cl.
*H02J 7/00* (2006.01)
*H04R 1/10* (2006.01)
(Continued)

(52) U.S. Cl.
CPC ........ *H02J 7/00032* (2020.01); *H02J 7/0045* (2013.01); *H02J 7/007* (2013.01);
(Continued)

(58) Field of Classification Search
CPC ...... H02J 7/007; H02J 7/0045; H02J 7/00712; H02J 7/00032; H02J 2207/20;
(Continued)

(56) References Cited

U.S. PATENT DOCUMENTS 6,337,827 B1   1/2002 Nakatake et al.
6,744,820 B1   6/2004 Khairallah et al.
(Continued)

FOREIGN PATENT DOCUMENTS

CN   103248221 A   8/2013
CN   106231474 A   12/2016
(Continued)

OTHER PUBLICATIONS

International Search Report and Written Opinion—PCT/US2021/025066—ISA/EPO—Jun. 30, 2021.
(Continued)

*Primary Examiner* — Edward Tso
*Assistant Examiner* — Aaron Piggush
(74) *Attorney, Agent, or Firm* — Loza & Loza, LLP

(57) ABSTRACT

An apparatus for generating an output voltage including a microcontroller unit (MCU) configured to selectively generate a data modulating signal; and a voltage regulator configured to generate an output voltage modulated based on the data modulating signal. Another aspect relates to a method of generating an output voltage comprising selectively generating a data modulating signal; and bucking and boosting an output voltage based on the data modulating signal. An additional aspect relates to an apparatus for generating an output voltage comprising means to selectively generate a data modulating signal, and means for bucking and boosting an output voltage based on the data modulating signal.

8 Claims, 6 Drawing Sheets

(51) Int. Cl.
*H02M 3/158* (2006.01)
*H04L 27/04* (2006.01)

(52) U.S. Cl.
CPC ........ *H02J 7/00712* (2020.01); *H04R 1/1025* (2013.01); *H02J 2207/20* (2020.01); *H02M 3/1582* (2013.01); *H04L 27/04* (2013.01); *H04R 1/1016* (2013.01)

(58) Field of Classification Search
CPC . H02M 3/1582; H04R 1/1016; H04R 1/1025; H04L 27/04
USPC .......................................... 320/140, 141, 157
See application file for complete search history.

(56) References Cited

U.S. PATENT DOCUMENTS

| | | | |
|---|---|---|---|
| 6,788,026 | B2 | 9/2004 | Muramatsu |
| 2011/0150065 | A1 | 6/2011 | Tailliet |
| 2017/0034618 | A1* | 2/2017 | Negi ..................... H04R 1/1025 |
| 2018/0233926 | A1* | 8/2018 | Chang ................. H02J 7/00036 |
| 2020/0119576 | A1 | 4/2020 | Lee et al. |
| 2020/0119578 | A1* | 4/2020 | O ....................... H02M 7/53878 |
| 2020/0127482 | A1* | 4/2020 | Ding ................. H02J 7/007194 |

FOREIGN PATENT DOCUMENTS

| | | |
|---|---|---|
| CN | 109309397 A | 2/2019 |
| CN | 109460101 A | 3/2019 |
| CN | 109638911 A | 4/2019 |
| WO | 03049264 A1 | 6/2003 |
| WO | 2019138664 A1 | 7/2019 |

OTHER PUBLICATIONS

Embedded: "Integration of Power: Communication Interfaces in Smart True Wireless Headset Designs", Mar. 12, 2019, pp. 1-10.

* cited by examiner

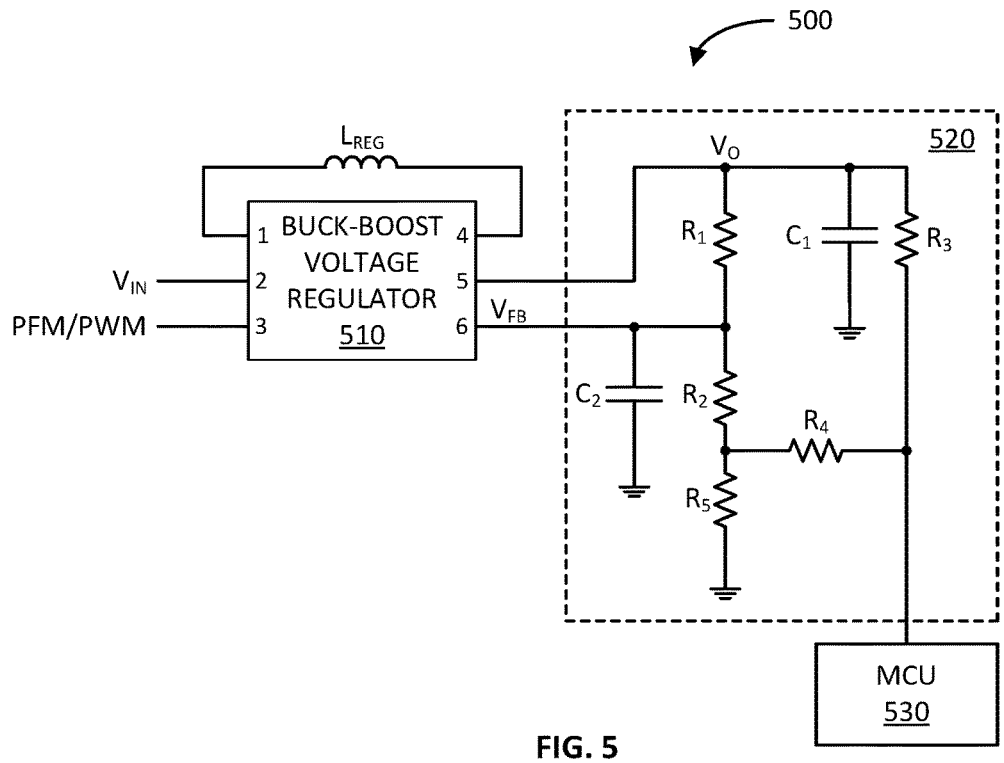
FIG. 5
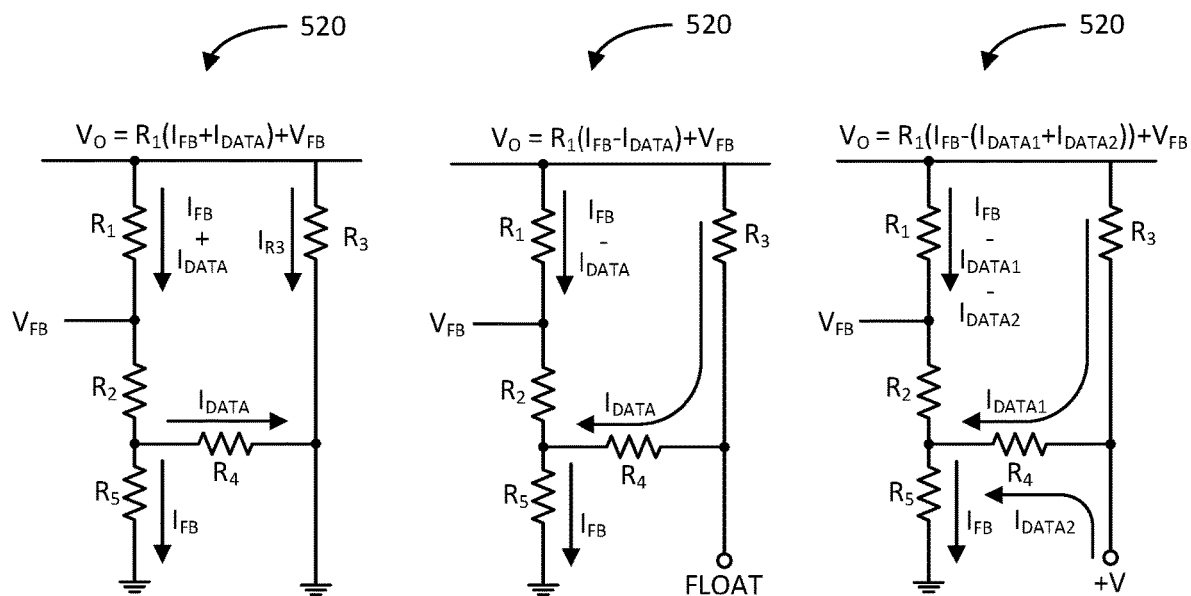
FIG. 6A   FIG. 6B   FIG. 6C

MODULATING SUPPLY VOLTAGE
GENERATED BY VOLTAGE REGULATOR
FOR TRANSMISSION OF DATA AND
POWER

CROSS-REFERENCE TO RELATED
APPLICATION

This application claims the benefit of the filing date of U.S. Provisional Application Ser. No. 63/004,339, filed on Apr. 2, 2020, which is incorporated herein by reference.

FIELD

Aspects of the present disclosure relate generally to the transmission of data and power, and in particular, to a system and method of modulating a supply voltage generated by a voltage regulator suitably enabled by design for transmission of data and power from a first device to a second device.

DESCRIPTION OF RELATED ART

In some applications, a first device provides power, such as a direct current (DC) voltage, to a second device, and also provides data to the second device. As an example, a charger provides power to a pair of earbuds for charging their respective batteries. The charger also provides data to the earbuds, as well as receive data from the earbuds. For example, the charger may send a message inquiring about the current charge level or state of the batteries, and the earbuds sending response messages back to the charger indicating the current charge level or state of the batteries.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

An aspect of the disclosure relates to an apparatus including a battery charger configured to charge a battery in an audio device and data communicate with the audio device, wherein the battery charger comprises: a microcontroller unit (MCU) configured to selectively generate a data modulating signal; and a voltage regulator configured to generate an output voltage modulated based on the data modulating signal, wherein the output voltage is used to charge the battery and data communicate with the audio device.

Another aspect of the disclosure relates to a method including selectively generating a data modulating signal; bucking and boosting an output voltage based on the data modulating signal; charging a battery in an audio device using the output voltage; and data communicating with the audio device using the output voltage.

Another aspect of the disclosure relates to an apparatus including means for selectively generate a data modulating signal; means for bucking and boosting an output voltage based on the data modulating signal; means for charging a battery in an audio device using the output voltage; and means for data communicating with the audio device using the output voltage.

Another aspect of the disclosure relates to a system including a charger having a connector configured to receive external power, a first microcontroller unit (MCU) configured to selectively generate a data modulating signal, and a voltage regulator configured to generate an output voltage based on the external power and the data modulating signal; and an audio device, including a battery configured to be charged based on the output voltage; and a second MCU configured to extract data based on the output voltage.

To the accomplishment of the foregoing and related ends, the one or more embodiments include the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the description embodiments are intended to include all such aspects and their equivalents.

BRIEF DESCRIPTION OF THE DRAWINGS

FIG. 5 illustrates a schematic view of another exemplary power and data communication apparatus configured to generate a regulated output voltage modulated with a data signal in accordance with another aspect of the disclosure.

FIGS. 6A-6C illustrate a schematic diagram of an exemplary feedback circuit of the buck-boost voltage regulator of FIG. 5 in three different configurations in accordance with another aspect of the disclosure.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1:
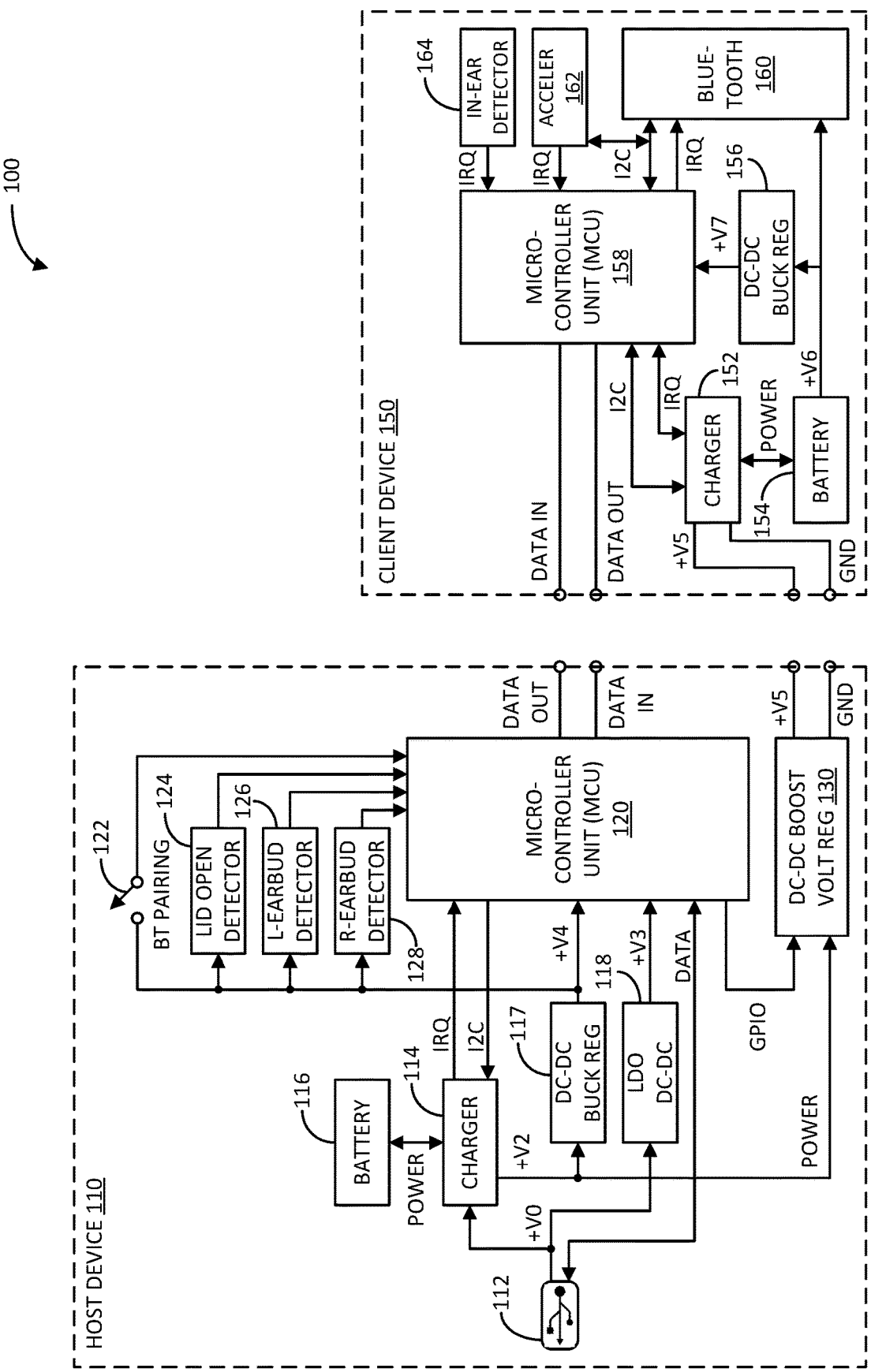
FIG. 1 illustrates a block diagram of an exemplary power and data communication system in accordance with an aspect of the disclosure.

FIG. 1 illustrates a block diagram of an exemplary power and data communication system 100 in accordance with an aspect of the disclosure. The power and data communication system 100 includes a host device 110 and a client device 150. In this example, the host device 110 is configured as a charger for audio earbuds, and the client device 150 is configured as an audio earbud. It shall be understood that the system 100 may include two audio earbuds for left- and right-ears, although one is shown for ease of explanation purposes.

The host device 110 may be any device that provides power (e.g., direct current (DC) supply voltage) to the client device 150 for charging a battery, and data for communicating with the client device 150. Further, in accordance with this example, the client device 150 may provide data to the host device 110. The host device (charger) 110 is just one example, and may be configured differently depending on its implemented features. Similarly, the client device (earbud) 150 is just one example, and may be configured differently depending on its implemented features.

The host device 110 includes a connector 112 (e.g., a Universal Serial Bus (USB) connector) configured to receive external power (e.g., a USB supply voltage +V0) from and exchange data with a device to which the connector 112 attaches (e.g., a computer, a power outlet adapter, etc.). The host device 110 further includes a battery charger 114 and a battery 116 (e.g., a lithium-ion battery). The battery charger 114 is configured to use the supply voltage +V0 from the connector 112 to provide power or charge the battery 116. The battery charger 114 or battery 116 is also configured to generate a supply voltage +V2 for other components described herein.

The host device 110 further includes a low dropout (LDO) voltage regulator 118 configured to generate a supply voltage +V3 based on the voltage +V0 received from the connector 112. The supply voltage +V3 may be suitable for certain circuits (e.g., USB data communication circuits) within a microcontroller unit (MCU) 120. The MCU 120 may be any type of processor, microprocessor, other programmable hardware, etc. The host device 110 further includes a DC-DC buck voltage regulator 117 configured to generate another supply voltage +V4 based on the supply voltage +V2 from the battery charger 114 or battery 116. The supply voltage +V4 may be suitable for other circuits (e.g., input/output (I/O) circuits) within the MCU 120.

The MCU 120 may communicate with the battery charger 114 via an interrupt request (IRQ) communication line and an inter-integrated circuit (I2C) communication line. For example, the battery charger 114 may inform the MCU 120 that the battery 116 is fully charged via the IRQ communication line. And, in response, the MCU 120 may instruct the battery charger 114 to cease charging the battery 116 via the I2C communication line to conserve power.

The host device 110 includes a left (L) earbud detector 126 and a right (R) earbud detector 128 configured to detect whether the left and right earbuds (client devices) are connected to the host device 110 for reception of DC power and exchange of data. As the L-earbud detector 126 and R-earbud detector 128 are I/O devices, these devices receive the supply voltage +V4 generated by the DC-DC buck voltage regulator 117. The L-earbud detector 126 and R-earbud detector 128 provide detection signals to the MCU 120 to configure the host device 110 in a relatively low power consumption mode (e.g., disabling a regulator for providing power to the earbuds) if the earbuds are not detected, and in a relatively high-power consumption (e.g., enabling the regulator for providing power to the earbuds) if the earbuds are detected.

The host device 110 further includes a lid open detector 124 configured to detect whether a lid to a compartment that is configured to house the left and right earbuds is opened.

A detection signal from the lid open detector 124 is provided to the MCU 120. This may be done to implement a fast pairing between the earbuds and an audio device (not shown). For example, if the lid is opened, the MCU 120 sends a command to the earbuds to pair with an audio device via Bluetooth communication with a nearby audio device (e.g., a smart phone, etc.). The host device 110 further includes a Bluetooth (BT) pairing detector 122 (represented as a switch) to provide a signal to the MCU 120 to indicate that the earbuds are paired with the audio device. As the lid open detector 124 and BT pairing detector 122 are I/O devices, these devices receive the supply voltage +V4 generated by the DC-DC buck voltage regulator 117.

The host device 110 further includes a DC-DC boost voltage regulator 130 configured to generate a regulated supply voltage +V5 from the supply voltage +V2 generated by the battery charger 114 or battery 116. The supply voltage +V5 provides power to the client device 150 (e.g., earbuds) via a pair of output pins and supply lines: one for +V5 and the other for ground (GND). The MCU 120 is configured to communicate with the DC-DC boost voltage regulator 130 via a general-purpose input/output (GPIO) communication line. Thus, if the MCU 120 determines that the earbuds are not connected via the detection signals form the L-earbud detector 126 and R-earbud detector 128 or the batteries in the earbuds are fully charged, the MCU 120 disables the DC-DC boost voltage regulator 130 via the GPIO line to conserve power. Otherwise, the MCU 120 enables the DC-DC boost voltage regulator 130 via the GPIO communication line.

The MCU 120 is coupled to a data output pin configured to provide data or messages to the client device 150. The MCU 120 is also coupled to a data input pin configured to receive data or messages from the client device 150. As, in this example, the host device 110 is a charger and the client device 150 is an earbud or pair of earbuds, the host device 110 may send data or messages to the client device 150 via the data out pin to inquire about the charge state of its battery (e.g., fully charged or not), and the client device 150 may provide data or messages to the host device 110 via the data in pin responding to the inquiry (e.g., battery fully charged or not). If, for example, the client device 150 indicates that its battery is fully charged, the MCU 120 may disable the DC-DC boost voltage regulator 130 via the GPIO communication line to conserve power; otherwise, the MCU 120 may maintain the regulator 130 enabled via the GPIO line. Depending on the nature of the host device 110 and client device 150, the messages exchanged between the devices may be different.

The client device 150 includes a battery charger 152 and a battery 154 (e.g., a lithium-ion battery). When the client device 150 is connected to the host device 110, the battery charger 152 receives the supply voltage +V5 and GND connection via a pair of pins and supply lines that connect to the corresponding +V5 and GND pins of the host device 110. The battery charger 152 is configured to use the supply voltage +V5 to provide power to or charge the battery 154. The battery 154 generates a supply voltage +V6 for other components described herein.

The client device 150 also includes a microcontroller unit (MCU) 158 (e.g., processor, microprocessor, any other type of programmable device, etc.) that communicates with the battery charger 152 via an I2C line and an IRQ line. The MCU 158 is coupled to a data in pin to receive data from the host device 110, and is also coupled to a data output pin to provide data to the host device 110, as previously discussed. As an example, if the MCU 158 receives a message from the MCU 120, via the host data out pin and client data in pin, inquiring about the charge state of the battery 154, the MCU 158 may send a message to the battery charger 152 via the IRQ line concerning the inquiry, and the battery charger 152 may provide its response to the MCU 158 via the I2C line. The MCU 158, in turn, may forward the response to the MCU 120 of the host device 110 via the client data out pin and the host data in pin.

The client device 150 further includes a DC-DC buck voltage regulator 156 configured to generate a supply voltage +V7 for the MCU 158 from the battery voltage +V6 generated by the battery 154. The client device 150 further includes a Bluetooth device 160 for pairing and communicating with an audio device (not shown), as previously discussed. The Bluetooth device 160 also receives the battery voltage +V6. The Bluetooth device 160 communicates with the MCU 158 via I2C and IRQ communication lines. The client device 150 may also include an in-ear detector 164 configured to detect whether the earbud is inside an ear, and an accelerometer 162 configured to detect movement of the earbud or indirect movement of a user's head. The in-ear detector 164 communicates with the MCU 158 via an IRQ communication line, and the accelerometer 162 communicates with the MCU 158 via IRQ and I2C communication lines.

A drawback of the power and data communication system 100 is that the host device 110 and client device 150 have separate pins for communicating data and power. For example, each of the devices 110 and 150 have two pins for exchanging data between each other. Each of these devices 110 and 150 also have two pins for the host device 110 to supply power to the client device 150. These pins add significant product costs to the devices 110 and 150, and also occupies significant circuit real estate. One solution to reduce the number of pins electrically connecting the host device 110 to client device 150 is to transmit data using the pins and supply lines for transmitting power from a host device to a client device.

Figure 2:
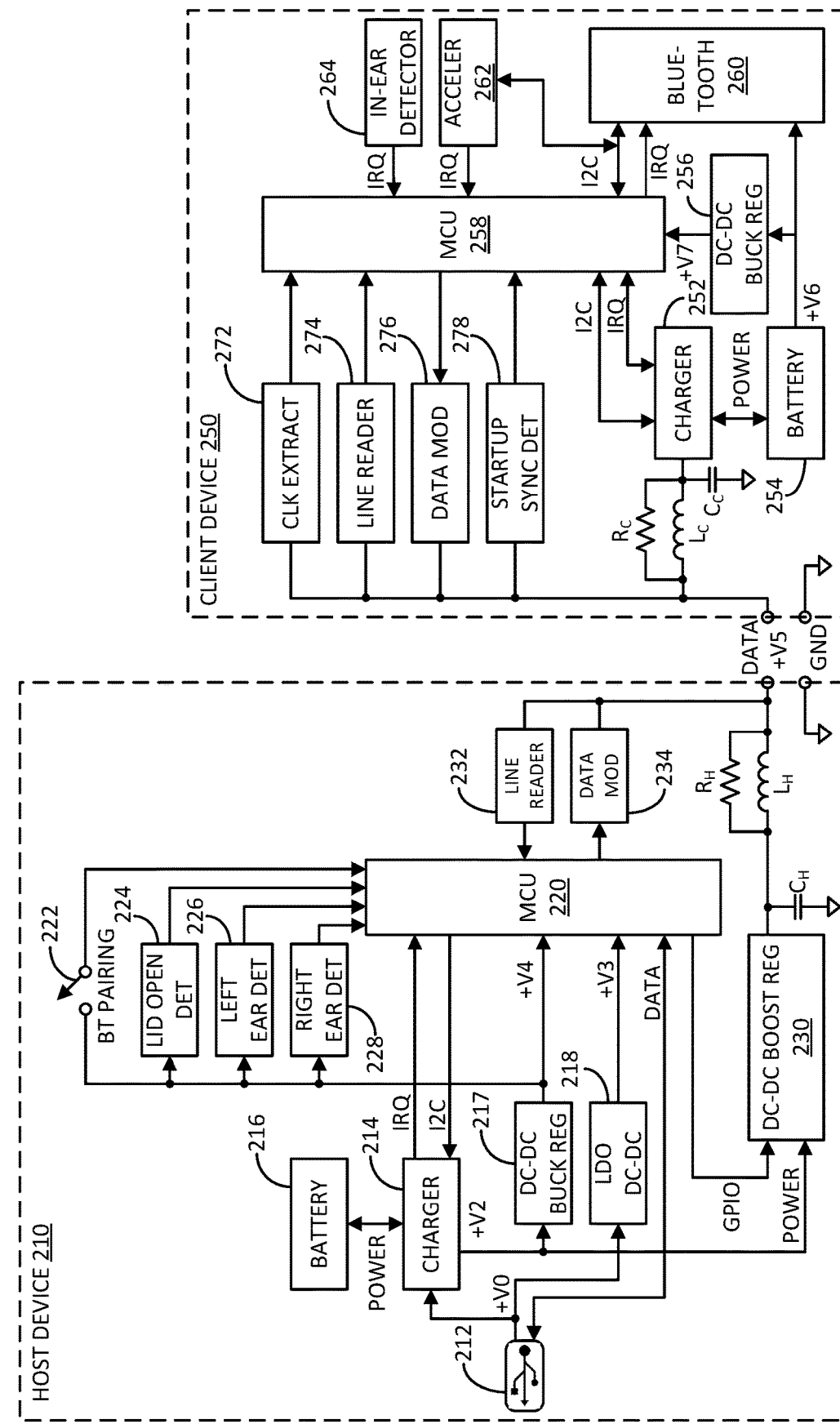
FIG. 2 illustrates a block diagram of another exemplary power and data communication system in accordance with another aspect of the disclosure.

FIG. 2 illustrates a block diagram of another exemplary power and data communication system 200 in accordance with another aspect of the disclosure. The power and data communication system 200 is similar to that of power and data communication system 100, and includes many of the same elements as indicated by similar reference numbers with the most significant digit (MSD) being a "2" in the case of system 200 in contrast to a "1" in the case of system 100. These same or similar elements have been described in detail above; and thus, no further detail explanation of these elements is provided below with reference to power and data communication system 200.

The power and data communication system 200 differs from power and data communication system 100 in that it includes the same pair of pins and supply lines to communicate power and data from the host device 210 to the client device 250 (as well as data from the client device 250 to the host device 210), and includes additional components to effectuate such dual purposes for the pins and supply lines. In this example, the host device 210 injects a data signal onto the supply voltage pin/line to transmit data to the client device 250. Similarly, the client device 250 injects a data signal onto the supply voltage pin/line to transmit data to the host device 210.

More specifically, the host device 210 further includes a host-side line reader 232, a host-side data modulator 234, a host-side data signal blocking inductor $L_H$, and a host-side dampening resistor $R_H$. The host-side line reader 232 is configured to extract the data, coming from the client device 250, from a data signal on the voltage supply pin/line, and provide the data to the MCU 220. The host-side data modulator 234 is configured to inject or provide a data signal onto the voltage supply pin/line based on data from the MCU 220 for transmission to the client device 250. The host-side inductor $L_H$ substantially blocks or isolates the data signal on the voltage supply pin/line from an alternating current (AC) decoupling capacitor $C_H$ at an output of the DC-DC boost voltage regulator 230, which would otherwise decouple the data signal from the voltage supply pin/line. The host-side resistor $R_H$, coupled across the inductor $L_H$, is configured to reduce signal reflections and electromagnetic emissions resulting from high-frequency harmonics and self-resonance effects of the inductor $L_H$.

The client device 250 further includes a clock extractor 272, a client-side line reader 274, a client-side data modulator 276, a startup synchronization detector 278, a client-side data signal blocking inductor $L_C$, and a client-side dampening resistor $R_C$. The clock extractor 272 may employ a clock and data recovery (CDR) circuit to extract a clock from the data signal on the voltage supply pin/line; the clock is provided to the MCU 258 for clocking in data. The client-side line reader 274 is configured to extract the data from the data signal, coming from the host device 210, from the voltage supply pin/line, and provide the data to the MCU 258. The client-side data modulator 276 is configured to inject or provide a data signal onto the voltage supply pin/line based on data from the MCU 258 for transmission to the host device 210. The client-side inductor $L_C$ blocks or isolates the data signal on the voltage supply pin/line from an AC decoupling capacitor Cc at an input of the battery charger 252, which would otherwise decouple the data signal from the voltage supply pin/line. The client-side resistor $R_C$, coupled across the inductor $L_C$, is configured to reduce signal reflections and electromagnetic emissions resulting from high-frequency harmonics and self-resonance effects of the inductor $L_C$.

Although, in the power and data communication system 200, the number of pins connecting the host device 210 to the client device 250 for transmission of power from the host device 210 to the client device 250 and exchange of data between these devices, have been reduced to two (2) as compared to that of power and data communication system 100, the number of components needed to do so in system 200 is numerous. As discussed, these additional components include the line reader 232, data modulator 234, inductor $L_H$, and resistor $R_H$ in the host device 210, and the clock extractor 272, line reader 274, data modulator 276, startup synchronization detector 278, inductor $L_C$, and resistor $R_C$ in the client device 250. These additional components significantly increase the product costs of the system 200, as well as occupies substantial circuit real estate to implement. Also, the additional inductors $L_H$ and $L_C$ may be a source of electromagnetic interference, which may make it difficult for these devices 210 and 250 to comply with electromagnetic compatibility (EMC) regulations.

Figure 3:
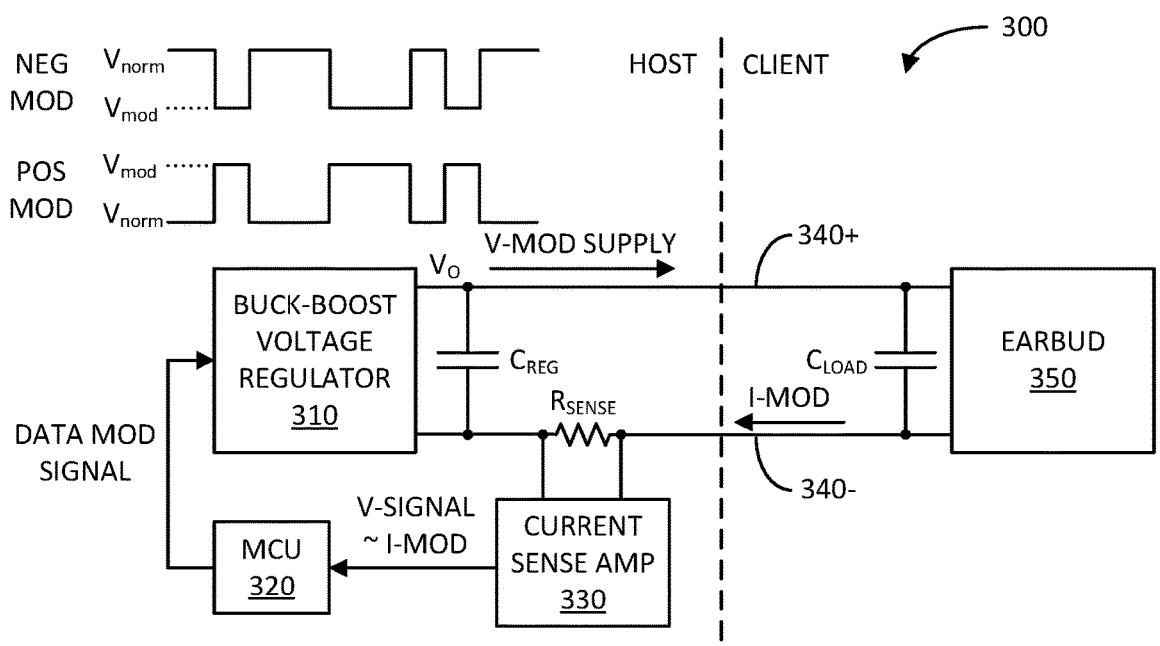
FIG. 3 illustrates a block diagram of another exemplary power and data communication system in accordance with another aspect of the disclosure.

FIG. 3 illustrates a block diagram of yet another exemplary power and data communication system 300 in accordance with an aspect of the disclosure. In summary, the power and data communication system 300 implements data transmission over power supply lines or pins between host- and client-devices without significant additional components and circuit real estate. Additionally, the power and data communication system 300 need not have data signal blocking inductors, which may be a source of unwanted electromagnetic emissions.

Further, the power and data communication system 300 implements the data transmission over the power lines by substituting the DC-DC boost voltage regulator 230 of system 200 with a buck-boost voltage regulator, and controlling the buck-boost voltage regulator to generate a regulated output voltage modulated with a data signal for transmission to the client-side. With regard to data transmission from the client-side to the host-side, the power and data communication system 300 may include a sense resistor with a current sense amplifier to detect current modulation effectuated by the client-side on the power supply line. Although a buck-boost voltage regulator is used herein to exemplify the power and data transmission concept, it shall be understood that other types of voltage regulators, switched-mode power supplies (SMPS), DC-DC power converters, charge pumps, etc., may be configured to perform the power and data transmission operation.

More specifically, the power and data communication system 300 includes a host-side buck-boost voltage regulator 310, a capacitor $C_{REG}$ coupled across positive and negative supply lines 340+ and 340− at the output of the regulator 310, a microcontroller unit (MCU) 320, a sense resistor $R_{SENSE}$, and a current sense amplifier 330. The MCU 320 selectively generates a data or voltage modulating signal for controlling the buck-boost voltage regulator 310 to generate a regulated output voltage $V_O$ that is modulated or varies with the data or voltage modulating signal. As the buck-boost voltage regulator 310 may be operated in a buck mode to actively reduce the output voltage $V_O$ by discharging the capacitor $C_{REG}$, and in a boost mode to actively increase the output voltage $V_O$ by charging the capacitor $C_{REG}$, the buck-boost voltage regulator 310 is able to counter the AC decoupling effects of the capacitor $C_{REG}$ and a load capacitor $C_{LOAD}$ at the client-side to move the output voltage $V_O$ up and down at a sufficient data rate to effectuate data transmission via the power lines 340+/340−. Thus, the buck-boost voltage regulator 310 is able to send data to the client-side via the data or voltage modulating signal generated by the MCU 320.

As depicted in FIG. 3, the data modulation of the regulated output voltage $V_O$ may be a positive modulation or a negative modulation, or combination thereof. In the positive modulation scheme, the regulated output voltage $V_O$ is varied between a normal voltage level $V_{norm}$ and a higher modulated voltage level $V_{mod}$ in accordance with the data to be transmitted. The normal voltage level $V_{norm}$ is a substantially fixed DC voltage required by a battery charger on the client side in order to charge a corresponding battery. Thus, when no data is being transmitted to the client side (the regulator 310 is not receiving the data modulation signal), the regulated output voltage $V_O$ of the buck-boost voltage regulator 310 is at substantially the normal voltage level $V_{norm}$. In the negative modulation scheme, the regulated output voltage $V_O$ is varied between the normal voltage level $V_{norm}$ and a lower modulated voltage level $V_{mod}$ in accordance with the data to be transmitted. The client-side, for example, the earbud 350, may include circuitry (e.g., a comparator, an analog-to-digital converter (ADC), etc.) to detect the positive or negative voltage modulation of the regulated output voltage $V_O$ of the regulator 310 in order to extract the data from the power lines 340+/340.

To effectuate the transmission of data from the client side to the host side, the client device or earbud 350 may dynamically vary its supply load in accordance with the data to be transmitted to effectuate current modulation (I-MOD) upon the power lines 340+ and 340−. The sense resistor $R_{SENSE}$, connected in series along the negative power line 340−, is configured to convert the current modulation (I-MOD) into a corresponding voltage signal. The current sense amplifier 330 is configured to receive the corresponding voltage signal and produce an amplified voltage signal representing the current-modulated data from the client side to the MCU 320.

Thus, the solution provided by the power and data communication system 300 requires little modification to the host device 110 and the client device 150 of system 100. For example, the DC-DC boost voltage regulator 130 may be replaced with the buck-boost voltage regulator 310. The data out signal from the MCU 120 may be provided to the buck-boost voltage regulator 310 to modulate its regulated output voltage $V_O$. And, a sense resistor $R_{SENSE}$ and current sense amplifier 330 may be provided on the return power line to demodulate the current modulation signal and provide the data to the MCU 120. On the client device 150, circuitry may be provided to demodulate the data-modulated regulated output voltage $V_O$ of the buck-boost voltage regulator 310, and other circuitry may be provided to vary its load with data in order to produce the current modulation signal for transmission of data to the host device 110.

Figure 4:
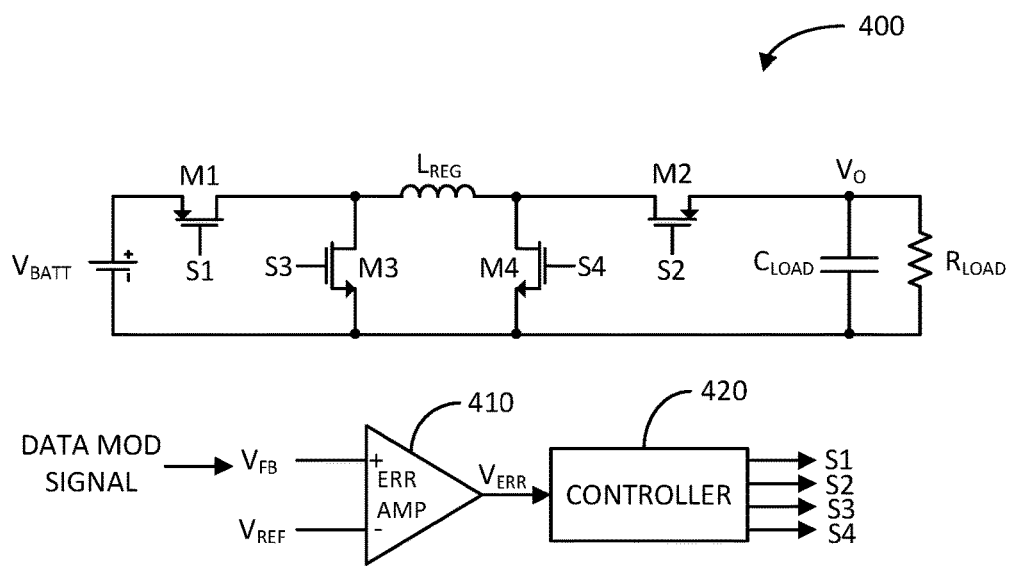
FIG. 4 illustrates a schematic view of an exemplary buck-boost voltage regulator configured to generate a regulated output voltage modulated with a data signal in accordance with another aspect of the disclosure.

FIG. 4 illustrates a schematic view of an exemplary buck-boost voltage regulator 400 configured to generate a regulated output voltage $V_O$ modulated with a data signal in accordance with another aspect of the disclosure. The buck-boost voltage regulator 400 includes four (4) switching devices M1-M4, a regulation inductor $L_{REG}$, an error amplifier 410, and a controller 420. The buck-boost voltage regulator 400 receives an input voltage $V_{BATT}$ from a battery or a battery charger (e.g., +V2 of systems 100 and 200), and generates a regulated output voltage $V_O$ across a resistive and capacitive load, represented as resistor $R_{LOAD}$ coupled in parallel with capacitor $C_{LOAD}$.

Each of the switching devices M1 and M2 may be configured as a p-channel metal oxide semiconductor (PMOS) field effect transistor (FET) or PMOS FET. Each of the switching devices M3 and M4 may be configured as an n-channel metal oxide semiconductor (NMOS) FET or NMOS FET. The PMOS FET M1 includes a source coupled to a positive side of the battery or supply and a gate configured to receive a control signal S1. The NMOS FET M3 includes a drain coupled to a drain of the PMOS FET M1, a source coupled to a negative side of the battery or supply, and a gate configured to receive a control signal S3. A first terminal of the regulation inductor $L_{REG}$ is coupled to the drain of PMOS FET M1 (also to the drain of NMOS FET M3).

The NMOS FET M4 includes a drain coupled to a second terminal of the regulation inductor $L_{REG}$, a source coupled to the negative side of the battery or supply, and a gate configured to receive a control signal S4. The PMOS FET M2 includes a drain coupled to the second terminal of the regulation inductor $L_{REG}$ (also to the drain of NMOS FET M4), a source coupled to a positive side of the load ($R_{LOAD}$ ∥ $C_{LOAD}$), and a gate configured to receive a control signal S2. The negative side of the load is coupled to the negative side of the battery or supply.

The error amplifier 410 includes a first (e.g., positive) input configured to receive a feedback voltage $V_{FB}$, which may be modulated with a data signal for transmission from a host device to a client device. The error amplifier 410 further includes a second (e.g., negative) input configured to receive a substantially constant reference voltage $V_{REF}$. The error amplifier 410 includes an output configured to produce an error voltage $V_{ERR}$ based on a difference between the feedback voltage $V_{FB}$ and the reference voltage $V_{REF}$. The controller 420 is configured to generate the control signals S1-S4 for the gates of the switching devices M1-M4 based on the error voltage $V_{ERR}$, respectively. The control signals S1-S4 control the on/off (closed/open) states of the switching devices M1-M4, respectively.

As discussed, the buck-boost voltage regulator 400 may be operated in the buck (continuous conduction) mode when the regulated output voltage $V_O$ is to be reduced by discharging the capacitive load $C_{LOAD}$. In the buck mode, the buck-boost voltage regulator 400 reduces the output voltage $V_O$ in order to maintain the feedback voltage $V_{FB}$ substantially equal to the reference voltage $V_{REF}$ (in other words, to maintain the error voltage $V_{ERR}$ substantially zero (0) Volt). As summarized in the operation table in FIG. 4, in buck mode, the controller 420 generates the control signals S1-S4 to turn on switching devices M1 and M2 and turn off switching devices M3 and M4 during a charging (of the inductor $L_{REG}$) phase; and turn on switching devices M2 and M3 and turn off switching devices M1 and M4 during a discharging (of the inductor $L_{REG}$) phase. The controller 420 performs the switching between the charging and discharging phases at high frequencies (e.g., 2.5 Mega Hertz (MHz)). In the buck mode, the output voltage $V_O$ is less than the input voltage $V_{batt}$, and may be given by $V_O=D*V_{batt}$, where D is the duty cycle defined as the time interval of the charging phase over the time interval of both the charging and discharging phases.

Also, as discussed, the buck-boost voltage regulator 400 may be operated in the boost (continuous conduction) mode when the regulated output voltage $V_O$ is to be increased by charging the capacitive load $C_{LOAD}$. In the boost mode, the buck-boost voltage regulator 400 increases the output voltage $V_O$ in order to maintain the feedback voltage $V_{FB}$ substantially equal to the reference voltage $V_{REF}$ (in other words, to maintain the error voltage $V_{ERR}$ substantially zero (0) Volt). As summarized in the operation table in FIG. 4, in boost mode, the controller 420 generates the control signals S1-S4 to turn on switching devices M1 and M4 and turn off switching devices M2 and M3 during a charging (of the inductor $L_{REG}$) phase; and turn on switching devices M1-M2 and turn off switching devices M3-M4 during a discharging (of the inductor $L_{REG}$) phase. During the inductor 'discharge' cycle, the positive-going back-EMF from the loaded end of the inductor $L_{REG}$ appears in series with the incoming supply by sustaining a supply circuit through M1 and M2 only. Similarly, the controller 420 performs the switching between the charging and discharging phases at high frequencies (e.g., 2.5 MHz). In the boost mode, the output voltage $V_O$ is greater than the input voltage $V_{batt}$, and may be given by $V_O=V_{batt}*(1/(1-D))$, where D is the duty cycle defined as the time interval of the charging phase over the time interval of both the charging and discharging phases.

Thus, with reference to the positive modulation timing diagram in FIG. 3, when there is no data being transmitted to the client device, the controller 420 in conjunction with the error amplifier 410 operate the switching devices M1-M4 via the control signals S1-S4 to regulate the output voltage $V_O$ to be substantially at $V_{norm}$ (e.g., nominally switching between boost and buck mode). As discussed, $V_{norm}$ is the voltage required by a battery charger to charge a battery at the client device (i.e., the voltage for supply power to the client device). When data is to be provided to the client device, the controller 420 in conjunction with the error amplifier 410 operate the switching devices M1-M4 via the control signals S1-S4 to aggressively operate in boost mode to increase the output voltage $V_O$ to $V_{mod}$ if a high logic data level is transmitted, and aggressively operate in buck mode to decrease the output voltage $V_O$ to $V_{norm}$ if a low logic data level is transmitted.

Similarly, with reference to the negative modulation timing diagram in FIG. 3, when there is no data being transmitted to the client device, the controller 420 in conjunction with the error amplifier 410 operate the switching devices M1-M4 via the control signals S1-S4 to regulate the output voltage $V_O$ to be substantially at $V_{norm}$ (e.g., nominally switching between boost and buck mode). Again, $V_{norm}$ is the voltage required by a battery charger to charge a battery at the client device (i.e., the voltage for supply power to the client device). When data is to be provided to the client device, the controller 420 in conjunction with the error amplifier 410 operate the switching devices M1-M4 via the control signals S1-S4 to aggressively operate in buck mode to decrease the output voltage $V_O$ to $V_{mod}$ if a low logic data level is transmitted, and aggressively operate in boost mode to increase the output voltage $V_O$ to $V_{norm}$ if a high logic data level is transmitted.

FIG. 5 illustrates a schematic view of an exemplary power and data communication apparatus 500 configured to generate a regulated output voltage $V_O$ modulated with a data signal in accordance with another aspect of the disclosure. The power and data communication apparatus 500 may be an exemplary more detailed implementation of how to operate an "off-the-shelf" buck-boost voltage regulator to produce a regulated output voltage including a DC voltage level needed by a client device for power purposes (e.g., charging a battery) and modulated with a data signal for transmission of data to the client device.

More specifically, the power and data communication apparatus 500 includes a buck-boost voltage regulator 510, which may be an "off-the-shelf" integrated circuit (IC) or a specifically designed IC for this particular application. The buck-boost voltage regulator IC 510 includes a set of pins 1-6. A regulation inductor $L_{REG}$ is coupled at both ends to pins 1 and 4 of the IC 510, respectively. Pin 2 of the IC 510 is configured to receive an input voltage $V_{IN}$, such as a battery or charger voltage (e.g., +V2 of systems 100 and 200). Pin 3 of the IC 510 is configured to receive a mode signal indicative of whether the buck-boost voltage regulator 510 is to be operated in pulse frequency modulation (PFM) mode or pulse width modulation (PWM) mode. The buck-boost voltage regulator 510 may be operated in PWM mode for optimal transient performance when data is to be transmitted to the client device, and in PFM mode for optimal power efficiency when no data (only power) is to be transmitted to the client device. Pin 5 of the IC 510 is the output of the buck-boost voltage regulator 510, where the regulated output voltage $V_O$ is generated. And, pin 6 of the IC 510 is configured to receive a feedback voltage $V_F$, which may be generated by a feedback network 520 by voltage dividing the output voltage $V_O$.

The feedback network 520 includes resistors $R_1$, $R_2$ and $R_5$ coupled in series between the output (pin 5) of the buck-boost voltage regulator 510 and ground. The feedback voltage $V_{FB}$ is generated at a node between resistors $R_1$ and $R_2$, and is provided to pin 6 of the IC 510. In accordance with possible manufacturer's requirements for regulator 510, a capacitor $C_2$ may be coupled between pin 6 of the IC 510 and ground to reduce noise in and stabilize the feedback voltage $V_F$B. The feedback network 520 further includes a resistor $R_3$ coupled between the output (pin 5) of the buck-boost voltage regulator 510 and a pin of a microcontroller unit (MCU) 530. Additionally, the feedback network 520 includes a resistor $R_4$ coupled between a node between resistors $R_2$ and $R_5$ and the pin of the MCU 530. A capacitor $C_1$ is coupled between the output (pin 5) of the buck-boost voltage regulator 510 and ground, and serves as the regulator output capacitor for sustaining the output voltage $V_O$ during switching.

Via its pin coupled to the feedback network 520, the MCU 530 affects or configures the feedback network 520 to modulate the output voltage $V_O$ of the buck-boost voltage regulator 510 with data. The operation will be discussed with reference to negative modulation, where the highest output voltage $V_O$ generated is the normal voltage level $V_{norm}$ required by the client device for power purposes (e.g., charging a battery). When no data is being transmitted to the client device, the buck-boost voltage regulator 510 regulates the output voltage $V_O$ to be substantially at $V_{norm}$. When the MCU 530 affects or configures the feedback network 520 to modulate the output voltage $V_O$ with data, the MCU 530 may cause the buck-boost voltage regulator 510 to set the output voltage $V_O$ to $V_{norm}$ if a high logic voltage level is desired, to set the output voltage $V_O$ to a $V_{mod}$ if a logic voltage level is desired, and to set the output voltage $V_O$ to a voltage lower than $V_{mod}$ (e.g., sub-$V_{mod}$) if a special operation is desired (e.g., initiating or waking-up the client device). Thus, the buck-boost voltage regulator 510 varies the output voltage $V_O$ between $V_{norm}$, $V_{mod}$, and sub-$V_{mod}$ in accordance with the data. The following provides a description of the configurations of the feedback network 520 to achieve the three different output voltage levels.

FIG. 6A illustrates a schematic diagram of the feedback network 520 when configured to produce the highest output voltage $V_O$ (e.g., at $V_{norm}$). In this configuration, the MCU 530 configures its pin to present ground potential to the feedback network 520. The ground potential at the MCU pin causes a current $I_{DATA}$ to flow from the node between $R_2$ and $R_5$ through resistor $R_4$ into the MCU pin, in addition to incidental current $I_{R3}$ from the output (pin 5) through resistor $R_3$ into the MCU pin. There is also a feedback current $I_{FB}$ flowing through resistor $R_5$ towards ground. Accordingly, the current flowing through resistor $R_1$ is the sum of the feedback current $I_{FB}$ and the $I_{DATA}$. As the buck-boost voltage regulator 510 regulates the output voltage $V_O$ to maintain the feedback voltage $V_{FB}$ substantially equal to an internal reference voltage $V_{REF}$, the output voltage $V_O$ may be given by the following equation:

$$V_O = R_1 * (I_{FB} + I_{DATA}) + V_{FB} \qquad \text{Eq. 1}$$

As discussed, in negative modulation, Eq. 1 is used to determine the level of the output voltage $V_O$ for $V_{norm}$.

FIG. 6B illustrates a schematic diagram of the feedback network 520 when configured to produce a lower output voltage $V_O$ (e.g., at $V_{mod}$). In this configuration, the MCU 530 tri-states its pin to present a relatively high impedance or a floating pin to the feedback network 520. The floating MCU pin causes a current $I_{DATA}$ to flow from the output (pin 5) of the buck-boost voltage regulator 510 via the resistors $R_3$ and $R_4$ into the node between $R_2$ and $R_5$. As discussed, there is a feedback current $I_{FB}$ flowing through resistor $R_5$ towards ground. Accordingly, the current flowing through resistor $R_1$ is the difference between the feedback current $I_{FB}$ and the $I_{DATA}$. As the buck-boost voltage regulator 510 regulates the output voltage $V_O$ to maintain the feedback voltage $V_{FB}$ substantially equal to an internal reference voltage $V_{REF}$, the output voltage $V_O$ may be given by the following equation:

$$V_O = R_1 * (I_{FB} - I_{DATA}) + V_{FB} \qquad \text{Eq. 2}$$

Comparing Eq. 2 with Eq. 1, it can be seen that the output voltage $V_O$ in the $V_{mod}$ configuration is less than the output voltage $V_O$ in the $V_{norm}$ configuration because the output voltage $V_O$ is a function of the difference in the currents $I_{FB}$ and $I_{DATA}$ in Eq. 2, and a function of the sum of the current $I_{FB}$ and $I_{DATA}$ in Eq. 1.

FIG. 6C illustrates a schematic diagram of the feedback network 520 when configured to produce the lowest output voltage $V_0$ (e.g., at sub-$V_{mod}$). In this configuration, the MCU 530 sets its pin to a high voltage +V, e.g., higher than the voltage at the node between resistors $R_2$ and $R_5$. The high voltage at the MCU pin causes another current $I_{DATA2}$, in addition to a current $I_{DATA1}$ flowing through resistor $R_3$, to flow into the node between $R_2$ and $R_5$. As discussed, there is a feedback current $T_{FB}$ flowing through resistor $R_5$ towards ground. Accordingly, the current flowing through resistor $R_1$ is the difference between the feedback current $I_{FB}$ and the sum of currents $I_{DATA1}$ and $I_{DATA2}$. As the buck-boost voltage regulator 510 regulates the output voltage $V_O$ to maintain the feedback voltage $V_{FB}$ substantially equal to an internal reference voltage $V_{REF}$, the output voltage $V_O$ may be given by the following equation:

$$V_O = R_1 * (I_{FB} - (I_{DATA1} + I_{DATA2})) + V_{FB} \qquad \text{Eq. 3}$$

Comparing Eq. 3 with Eq. 2, it can be seen that the output voltage $V_O$ in the sub-$V_{mod}$ configuration is less than the output voltage $V_O$ in the $V_{mod}$ configuration because the output voltage $V_O$ is a function of the difference in the current $I_{FB}$ and the sum of the currents $I_{DATA1}$ and $I_{DATA2}$ in Eq. 3, and a function of the difference between the currents $I_{FB}$ and $I_{DATA}$ in Eq. 2.

The exemplary implementation described herein features a resistor feedback network to simply modulate a boost-buck voltage regulator from a microcontroller. However, it would be possible to alternatively modulate the reference voltage of a voltage regulator if such mechanism is afforded by the chosen voltage regulator.

Figure 7A:
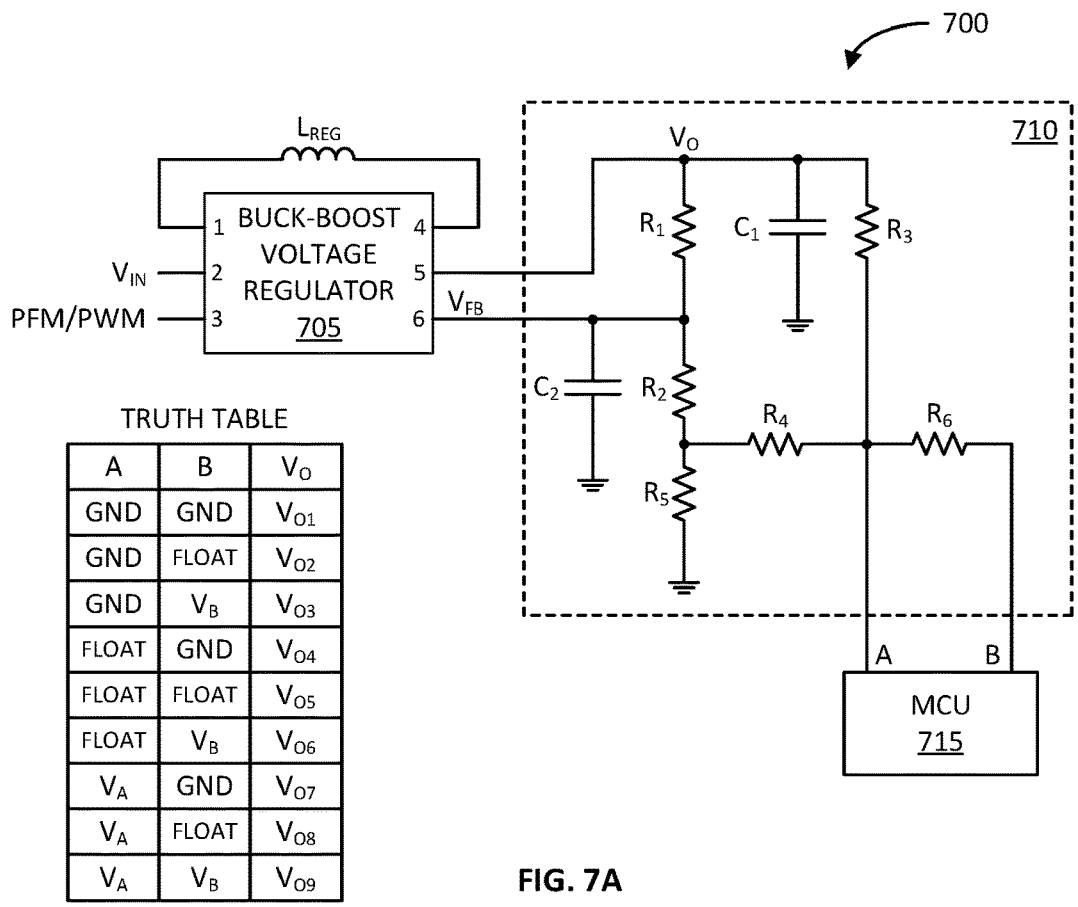
FIGS. 7A-7C illustrate schematic diagrams of exemplary buck-boost voltage regulators with different feedback circuits in accordance with other aspects of the disclosure.

FIG. 7A illustrates a schematic diagram of another exemplary power and data communication apparatus 700 in accordance with another aspect of the disclosure. In the power and data communication apparatus 500, the MCU 530 applied three (3) different inputs (e.g., GND, Float, and +V), via a single pin, to the feedback network 520 to cause the voltage regulator 510 to generate three different voltage levels for the output voltage $V_O$. In power and data communication apparatus 700, an MCU includes more than one pin (e.g., two pins) to which an MCU may apply different inputs to a feedback network. This results in the MCU causing the voltage regulator to generate more than (3) voltage levels for the output voltage $V_O$, as discussed in more detail herein.

More specifically, the power and data communication apparatus 700 includes a buck-boost voltage regulator 705 similar to buck-boost voltage regulator 510 previously discussed (e.g., including pins 1 and 4 across which an inductor $L_{REG}$ may be coupled, a pin 2 to receive an input voltage $V_{IN}$, a pin 3 configured to receive a mode signal indicative of a pulse frequency modulation (PFM) mode or pulse width modulation (PWM) mode, a pin 5 at which the buck-boost voltage regulator 705 generates the output voltage $V_O$, and a pin 6 to receive a feedback voltage $V_F B$ related to the output voltage $V_O$ via a feedback network 710).

The feedback network 710, in turn, includes resistors $R_1$, $R_2$, and $R_5$ coupled in series between the output (pin 5) of the buck-boost voltage regulator 705 and ground. A first capacitor $C_1$ is also coupled between the output (pin 5) of the buck-boost voltage regulator 705 and ground. Pin 6 of the buck-boost voltage regulator 705 is coupled to a node between resistors $R_1$ and $R_2$. A second capacitor $C_2$ is coupled between pin 6 and ground. The feedback network 710 further includes a resistor $R_3$ coupled between the output (pin 5) of the buck-boost voltage regulator 705 and a first pin A of the MCU 715. Similarly, the feedback network 710 includes a resistor $R_4$ coupled between a node between resistors $R_2$ and $R_5$ and the first pin A of the MCU 715. Additionally, the feedback network 710 includes a resistor $R_6$ coupled between the first pin A and a second pin B of the MCU 715.

By having two pins A and B to couple to the feedback network 710, the MCU 715 is able to generate different relationships between the feedback voltage $V_{FB}$ and the output voltage $V_O$ such that, for example, more than three (3) voltages levels for the output voltage $V_O$ may be achieved. A truth table also depicted in FIG. 7A shows nine (9) different voltage levels $V_{O1}$ to $V_{O9}$ for the output voltage $V_O$ that may be achieved by the MCU 715 apply different combinations of ground, float, and voltage ($V_A$ or $V_B$) to the pins A and B.

Figure 7B:
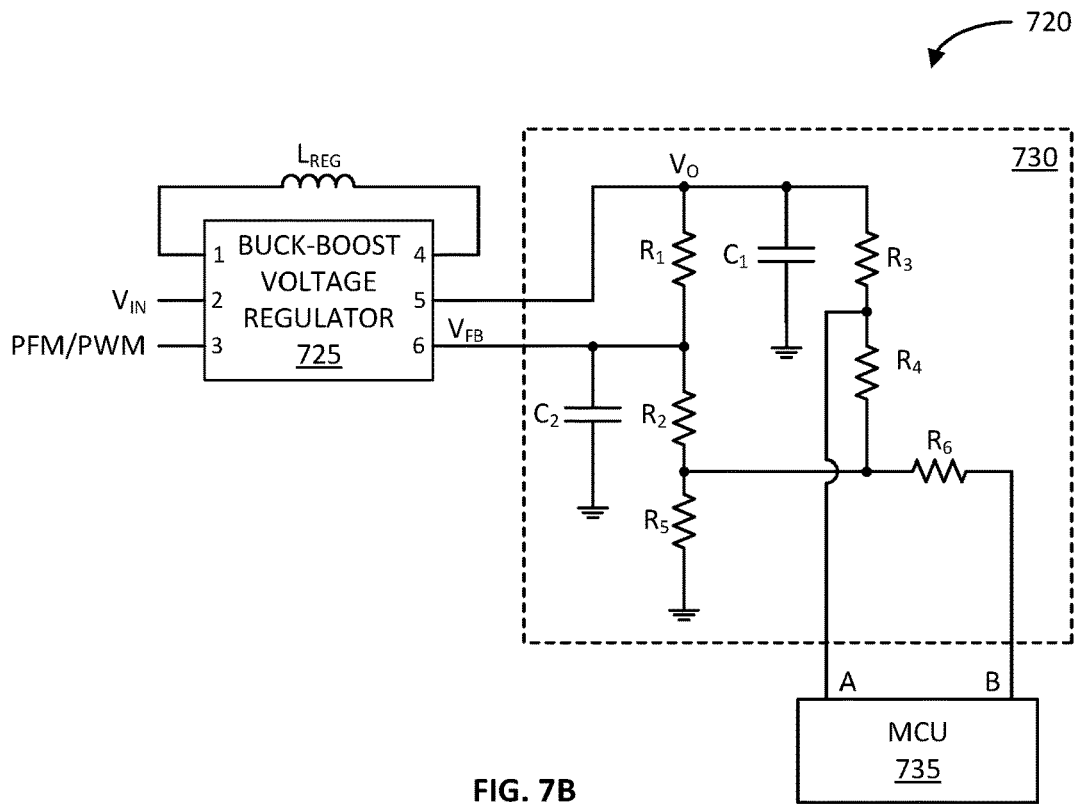

FIG. 7B illustrates a schematic diagram of another exemplary power and data communication apparatus 720 in accordance with another aspect of the disclosure. The power and data communication apparatus 720 is an alternative implementation of the power and data communication apparatus 700 with a different configuration for a feedback network. In particular, the power and data communication apparatus 720 includes a buck-boost voltage regulator 725 similar to buck-boost voltage regulator 705 previously discussed.

The power and data communication apparatus 720 further includes a feedback network 730 including resistors $R_1$, $R_2$, and $R_5$ coupled in series between the output (pin 5) of the buck-boost voltage regulator 725 and ground. A first capacitor $C_1$ is also coupled between the output (pin 5) of the buck-boost voltage regulator 725 and ground. Pin 6 of the buck-boost voltage regulator 725 is coupled to a node between resistors $R_1$ and $R_2$. A second capacitor $C_2$ is coupled between pin 6 and ground.

The feedback network 730 includes a resistor $R_3$ coupled in series with a resistor $R_4$ between the output (pin 5) of the buck-boost voltage regulator 725 and a node between resistors $R_2$ and $R_5$. A first pin A of the MCU 735 is coupled to a node between resistors $R_3$ and $R_4$. The feedback network 730 further includes a resistor $R_6$ coupled between a node between resistors $R_2$ and $R_5$ and a second pin B of the MCU 735. By having two pins A and B via which to couple to the feedback network 730, the MCU 735 is able to generate different relationships between the feedback voltage $V_{FB}$ and the output voltage $V_O$ such that, for example, more than three (3) voltages levels for the output voltage $V_O$ may be achieved. The truth table depicted in FIG. 7A may also be applicable to the power and data communication apparatus 720.

Figure 7C:
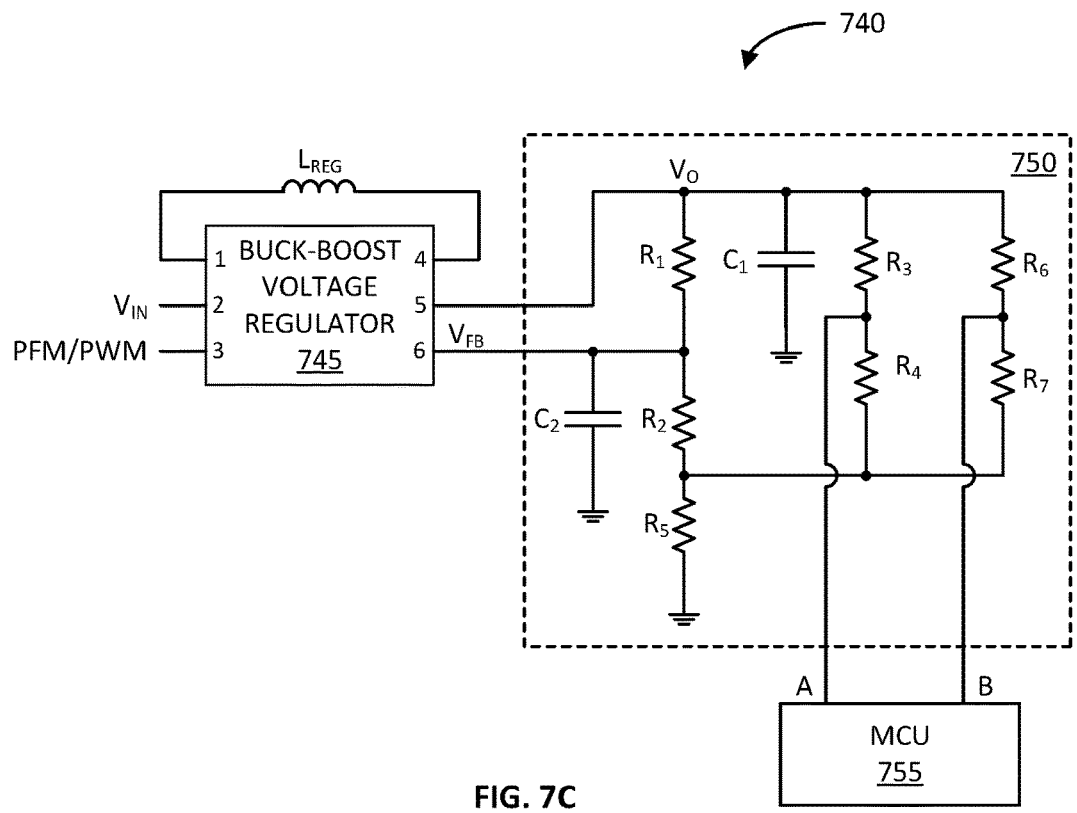

FIG. 7C illustrates a schematic diagram of another exemplary power and data communication apparatus 740 in accordance with another aspect of the disclosure. The power and data communication apparatus 740 is an alternative implementation of the power and data communication apparatus 700 or 720 with yet a different configuration for a feedback network. In particular, the power and data communication apparatus 740 includes a buck-boost voltage regulator 745 similar to buck-boost voltage regulator 705 or 725 previously discussed.

The power and data communication apparatus 740 further includes a feedback network 750 including resistors $R_1$, $R_2$, and $R_5$ coupled in series between the output (pin 5) of the buck-boost voltage regulator 745 and ground. A first capacitor $C_1$ is also coupled between the output (pin 5) of the buck-boost voltage regulator 745 and ground. Pin 6 of the buck-boost voltage regulator 745 is coupled to a node between resistors $R_1$ and $R_2$. A second capacitor $C_2$ is coupled between pin 6 and ground.

The feedback network 750 further includes a resistor $R_3$ coupled in series with a resistor $R_4$ between the output (pin 5) of the buck-boost voltage regulator 745 and a node between resistors $R_2$ and $R_5$. A first pin A of the MCU 755 is coupled to a node between resistors $R_3$ and $R_4$. The feedback network 750 further includes a resistor $R_6$ coupled in series with a resistor $R_7$ between the output (pin 5) of the buck-boost voltage regulator 745 and the node between resistors $R_2$ and $R_5$. A second pin B of the MCU 755 is coupled to a node between resistors $R_6$ and $R_7$. By having two pins A and B via which to couple to the feedback network 750, the MCU 755 is able to generate different relationships between the feedback voltage $V_{FB}$ and the output voltage $V_O$ such that, for example, more than three (3) voltages levels for the output voltage $V_O$ may be achieved. The truth table depicted in FIG. 7A may also be applicable to the power and data communication apparatus 740.

Figure 8:
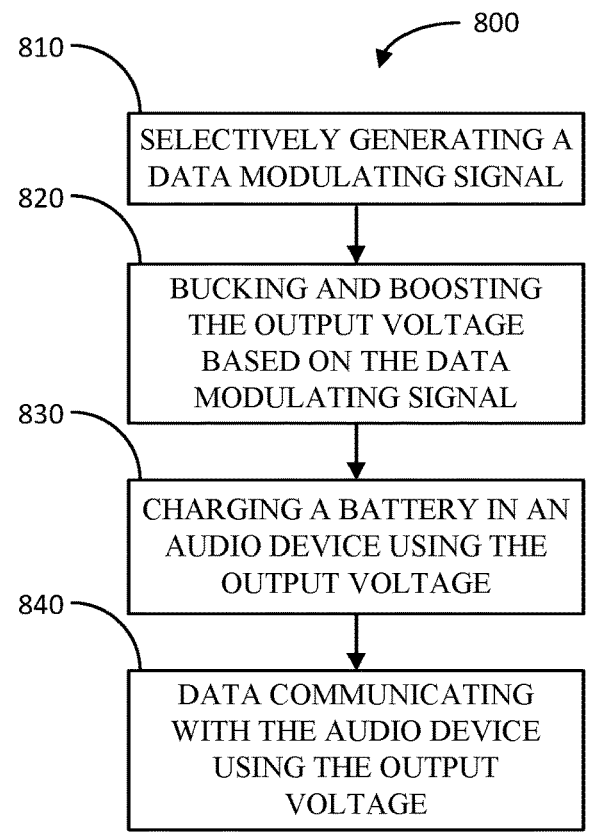
FIG. 8 illustrates a flow diagram of an exemplary method of generating a regulated output voltage in accordance with another aspect of the disclosure.

FIG. 8 illustrates a flow diagram of an exemplary method 800 of generating an output voltage in accordance with another aspect of the disclosure. The method 800 includes selectively generating a data modulating signal (block 810). Examples of a means for selectively generating a data modulating signal includes any of the microcontroller units (MCUs) described herein. The method 800 further includes bucking and boosting the output voltage based on the data modulating signal (block 820). Examples of a means for bucking and boosting the output voltage based on the data modulating signal includes any of the buck-boost voltage regulators described herein, or other possible voltage regulator able to support the generation of a data modulated supply in accordance with the methods and variations described herein.

The method 800 further includes charging a battery in an audio device using the output voltage (block 830). Examples of means for charging a battery in an audio device using the output voltage including an electrical connection between any of the buck-boost voltage regulators described herein and a battery in an audio device, such as an earbud described herein. Additionally, the method 800 includes data communicating with the audio device using the output voltage (block 840). Examples of means for data communicating with the audio device using the output voltage include an electrical connection between any of the buck-boost voltage regulators described herein and a processor (e.g., MCU) in an audio device, such as an earbud described herein.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed:
1. An apparatus, comprising:
 a battery charger configured to charge a battery in an audio device and data communicate with the audio device, wherein the battery charger comprises:

a microcontroller unit (MCU) configured to selectively generate a data modulating signal; and a voltage regulator configured to generate an output voltage modulated based on the data modulating signal, wherein the output voltage is used to charge the battery and data communicate with the audio device; and a feedback network including a first resistor coupled in series with a second resistor between an output of the voltage regulator and ground, wherein the feedback network is configured to generate a feedback voltage at a node between the first and second resistors, wherein the voltage regulator is configured to generate the output voltage to maintain the feedback voltage substantially equal to a reference voltage, wherein the feedback network further comprises:

a third resistor coupled between the second resistor and ground;

a fourth resistor coupled between the output of the voltage regulator and a pin of the MCU; and a fifth resistor coupled between a node between the second and third resistors and the pin of the MCU.

2. The apparatus of claim 1, wherein the MCU is configured to ground the pin to cause the voltage regulator to generate the output voltage at a voltage level.

3. The apparatus of claim 1, wherein the MCU is configured to float the pin to cause the voltage regulator to generate the output voltage at a voltage level.

4. The apparatus of claim 1, wherein the MCU is configured to set the pin at a first voltage level to cause the voltage regulator to generate the output voltage at a second voltage level.

5. An apparatus, comprising:

a battery charger configured to charge a battery in an audio device and data communicate with the audio device, wherein the battery charger comprises:

a microcontroller unit (MCU) configured to selectively generate a data modulating signal; and a voltage regulator configured to generate an output voltage modulated based on the data modulating signal, wherein the output voltage is used to charge the battery and data communicate with the audio device; and a feedback network including a first resistor coupled in series with a second resistor between an output of the voltage regulator and ground, wherein the feedback network is configured to generate a feedback voltage at a node between the first and second resistors, wherein the voltage regulator is configured to generate the output voltage to maintain the feedback voltage substantially equal to a reference voltage, wherein the feedback network further comprises:

a third resistor coupled between the second resistor and ground;

a fourth resistor coupled between the output of the voltage regulator and a first pin of the MCU; and a fifth resistor coupled between a node between the second and third resistors and the first pin or a second pin of the MCU.

6. The apparatus of claim 5, wherein the fifth resistor is coupled between the node and the first pin of the MCU, and wherein the feedback network further comprises a sixth resistor coupled between the first and second pins of the MCU.

7. The apparatus of claim 5, wherein the fifth resistor is coupled between the node and the second pin of the MCU, and wherein the feedback network further comprises a sixth resistor coupled between the fourth resistor and the fifth resistor.

8. The apparatus of claim 5, wherein the fifth resistor is coupled between the node and the first pin of the MCU, and wherein the feedback network further comprises a sixth resistor coupled between the output of the voltage regulator and the second pin of the MCU, and a seventh resistor coupled between the node and the second pin of the MCU.

\* \* \* \* \*